US010204621B2

United States Patent
Cui et al.

(10) Patent No.: US 10,204,621 B2
(45) Date of Patent: *Feb. 12, 2019

(54) ADJUSTING A DEEP NEURAL NETWORK ACOUSTIC MODEL (71) Applicant: International Business Machines Corporation, Armonk, NY (US)

(72) Inventors: Xiaodong Cui, Chappaqua, NY (US); Vaibhava Goel, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/258,836

(22) Filed: Sep. 7, 2016

(65) Prior Publication Data

US 2018/0068655 A1    Mar. 8, 2018

(51) Int. Cl.
| | |
|---|---|
| *G10L 15/07* | (2013.01) |
| *G10L 15/06* | (2013.01) |
| *G10L 17/18* | (2013.01) |
| *G10L 15/16* | (2006.01) |

(52) U.S. Cl.
CPC ............ *G10L 15/16* (2013.01); *G10L 15/063* (2013.01); *G10L 15/07* (2013.01); *G10L 15/075* (2013.01); *G10L 17/18* (2013.01)

(58) Field of Classification Search
CPC ........ G10L 15/07; G10L 15/063; G10L 17/18
See application file for complete search history.

(56) References Cited

U.S. PATENT DOCUMENTS

| | | | |
|---|---|---|---|
| 7,089,183 B2 * | 8/2006 | Gong | ............... G10L 15/07 704/244 |
| 7,831,424 B2 | 11/2010 | Chaudhari et al. | |
| 9,378,464 B2 | 6/2016 | Caskey et al. | |
| 9,640,194 B1 * | 5/2017 | Nemala | ............... G10L 21/0208 |
| 9,798,653 B1 * | 10/2017 | Shao | ............... G06F 12/00 |
| 2012/0130716 A1 * | 5/2012 | Kim | ............... B25J 13/003 704/256.1 |
| 2014/0214417 A1 | 7/2014 | Wang et al. | |
| 2015/0127346 A1 * | 5/2015 | Gruenstein | ............. G10L 15/08 704/254 |
| 2015/0149165 A1 | 5/2015 | Saon | |
| 2015/0149174 A1 * | 5/2015 | Gollan | ................ G10L 15/285 704/246 |
| 2015/0161994 A1 | 6/2015 | Tang et al. | |

(Continued)

OTHER PUBLICATIONS

Padmanabhan, M., & Dharanipragada, S. (2004). Maximum-likelihood nonlinear transformation for acoustic adaptation. IEEE Transactions on Speech and Audio Processing, 12(6), 572-578.*

(Continued)

*Primary Examiner* — Paras D Shah
*Assistant Examiner* — Bryan S Blankenagel
(74) *Attorney, Agent, or Firm* — Zilka-Kotab, P.C.

(57) ABSTRACT

A computer-implemented method according to one embodiment includes estimating a speaker dependent acoustic model utilizing test speech data and a hybrid estimation technique, transforming labeled speech data to create transformed speech data, utilizing the speaker dependent acoustic model and a nonlinear transformation, and adjusting a deep neural network (DNN) acoustic model, utilizing the transformed speech data.

20 Claims, 7 Drawing Sheets

(56) References Cited

U.S. PATENT DOCUMENTS

| | | | |
|---|---|---|---|
| 2015/0269933 A1* | 9/2015 | Yu | G10L 15/16 704/232 |
| 2016/0019884 A1 | 1/2016 | Xiao et al. | |
| 2016/0316059 A1* | 10/2016 | Nuta | H04M 3/5175 |
| 2017/0103752 A1* | 4/2017 | Senior | G10L 15/16 |
| 2018/0068654 A1 | 3/2018 | Cui et al. | |

OTHER PUBLICATIONS

Variani, E., Lei, X., McDermott, E., Moreno, I. L., & Gonzalez-Dominguez, J. (May 2014). Deep neural networks for small footprint text-dependent speaker verification. In Acoustics, Speech and Signal Processing (ICASSP), 2014 IEEE International Conference on (pp. 4052-4056). IEEE.*

Cui, X., Goel, V., & Kingsbury, B. (Apr. 2015). Data augmentation for deep convolutional neural network acoustic modeling. In Acoustics, Speech and Signal Processing (ICASSP), 2015 IEEE International Conference on (pp. 4545-4549). IEEE.*

Wu, Z., Sivadas, S., Tan, Y. K., Bin, M., & Goh, R. S. M. (2016). Multi-Modal Hybrid Deep Neural Network for Speech Enhancement. arXiv preprint arXiv:1606.04750.*

Bhattacharya, G., Alam, J., Kenn, P., & Gupta, V. (Dec. 2016). Modelling speaker and channel variability using deep neural networks for robust speaker verification. In Spoken Language Technology Workshop (SLT), 2016 IEEE (pp. 192-198). IEEE.*

Ioffe, S., & Szegedy, C. (Jun. 2015). Batch normalization: Accelerating deep network training by reducing internal covariate shift. In International conference on machine learning (pp. 448-456).*

Graves et al., "Speech Recognition with Deep Recurrent Neural Networks," IEEE International Conference on Acoustics, Speech and Signal Processing, 2013, pp. 6645-6649.

Nakamura, "Acoustic Modeling for Speech Recognition Based on a Generalized Laplacian Mixture Distribution," Electronics and Communications in Japan, Part 2, vol. 85, No. 11, 2002, pp. 32-42.

Cui et al., U.S. Appl. No. 15/258,799, filed Sep. 7, 2016.

List of IBM Patents or Patent Applications Treated as Related.

Non-Final Office Action from U.S. Appl. No. 15/258,799, dated Aug. 25, 2017.

Final Office Action from U.S. Appl. No. 15/258,799, dated Dec. 27, 2017.

Advisory Action from U.S. Appl. No. 15/258,799, dated Mar. 13, 2018.

Non-Final Office Action from U.S. Appl. No. 15/258,799, dated Apr. 20, 2018.

Notice of Allowance from U.S. Appl. No. 15/258,799, dated Sep. 27, 2018.

* cited by examiner

ADJUSTING A DEEP NEURAL NETWORK ACOUSTIC MODEL

This invention was made with government support under W911NF-12-C-0012 awarded by the United States Department of Defense. The government has certain rights to this invention.

BACKGROUND

The present invention relates to automatic speech recognition (ASR), and more specifically, this invention relates to adjusting a deep neural network (DNN) acoustic model used in ASR.

Deep neural network (DNN) acoustic models are frequently used in the performance of automatic speech recognition (ASR). However, current methodologies for adapting DNN acoustic models to new test conditions suffer from covariate shift which arises from a distribution mismatch between training data and test data.

SUMMARY

A computer-implemented method according to one embodiment includes estimating a speaker dependent acoustic model utilizing test speech data and a hybrid estimation technique, transforming labeled speech data to create transformed speech data, utilizing the speaker dependent acoustic model and a nonlinear transformation, and adjusting a deep neural network (DNN) acoustic model, utilizing the transformed speech data.

According to another embodiment, a computer program product for adjusting a deep neural network (DNN) acoustic model comprises a computer readable storage medium having program instructions embodied therewith, wherein the computer readable storage medium is not a transitory signal per se, and where the program instructions are executable by a processor to cause the processor to perform a method comprising estimating, utilizing the processor, a speaker dependent acoustic model utilizing test speech data and a hybrid estimation technique, transforming, utilizing the processor, labeled speech data to create transformed speech data, utilizing the speaker dependent acoustic model and a nonlinear transformation, and adjusting, utilizing the processor, the DNN acoustic model, utilizing the transformed speech data.

A system according to another embodiment includes a processor, and logic integrated with the processor, executable by the processor, or integrated with and executable by the processor, the logic being configured to estimate a speaker dependent acoustic model utilizing test speech data and a hybrid estimation technique, transform labeled speech data to create transformed speech data, utilizing the speaker dependent acoustic model and a nonlinear transformation, and adjust a deep neural network (DNN) acoustic model, utilizing the transformed speech data.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for adjusting a deep neural network acoustic model. Various embodiments provide a method to transform labeled speech data utilizing a speaker dependent acoustic model, and use the transformed data to adjust the deep neural network acoustic model.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for adjusting a deep neural network acoustic model.

In one general embodiment, a computer-implemented method includes estimating a speaker dependent acoustic model utilizing test speech data and a hybrid estimation technique, transforming labeled speech data to create transformed speech data, utilizing the speaker dependent acoustic model and a nonlinear transformation, and adjusting a deep neural network (DNN) acoustic model, utilizing the transformed speech data.

In another general embodiment, a computer program product for adjusting a deep neural network (DNN) acoustic model comprises a computer readable storage medium having program instructions embodied therewith, wherein the computer readable storage medium is not a transitory signal per se, and where the program instructions are executable by a processor to cause the processor to perform a method comprising estimating, utilizing the processor, a speaker dependent acoustic model utilizing test speech data and a hybrid estimation technique, transforming, utilizing the processor, labeled speech data to create transformed speech data, utilizing the speaker dependent acoustic model and a nonlinear transformation, and adjusting, utilizing the processor, the DNN acoustic model, utilizing the transformed speech data.

In another general embodiment, a system includes a processor, and logic integrated with the processor, executable by the processor, or integrated with and executable by the processor, the logic being configured to estimate a speaker dependent acoustic model utilizing test speech data and a hybrid estimation technique, transform labeled speech data to create transformed speech data, utilizing the speaker dependent acoustic model and a nonlinear transformation, and adjust a deep neural network (DNN) acoustic model, utilizing the transformed speech data.

Figure 1:
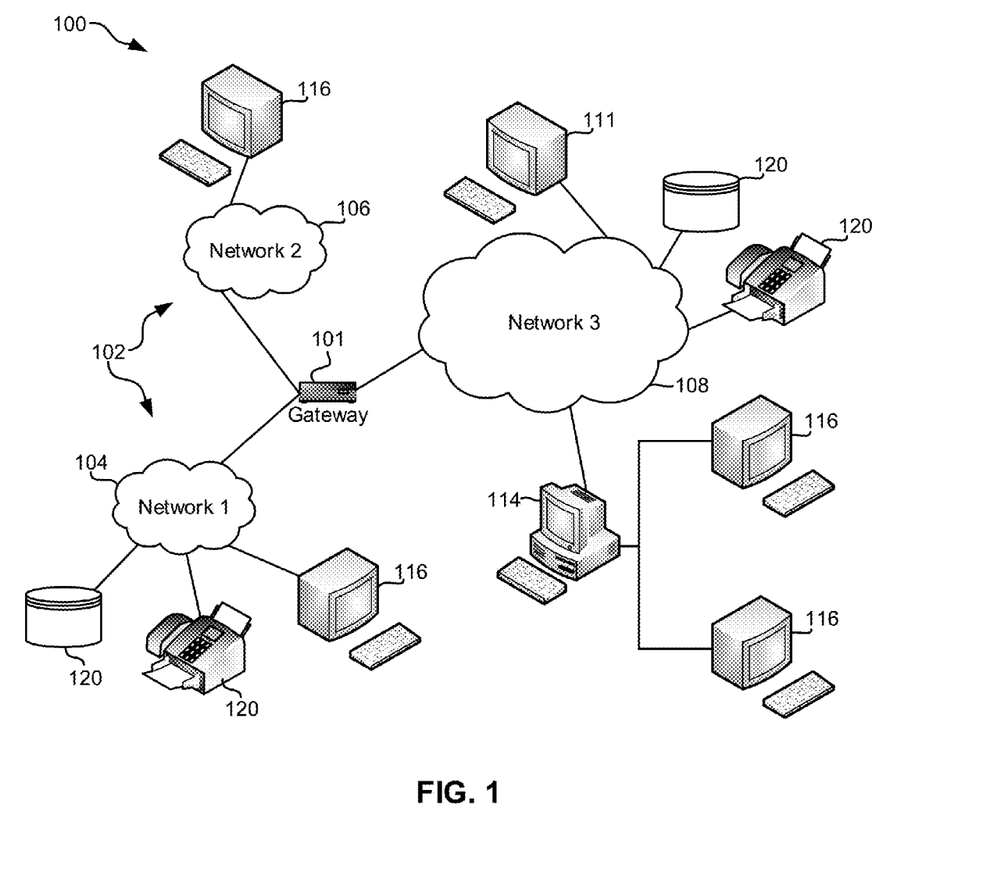
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
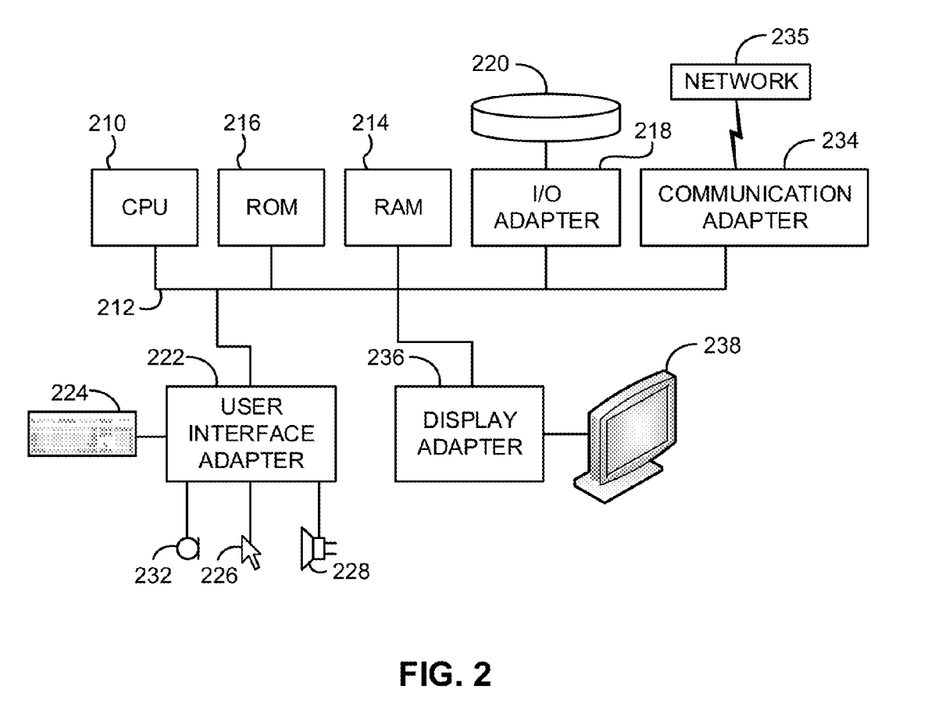
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
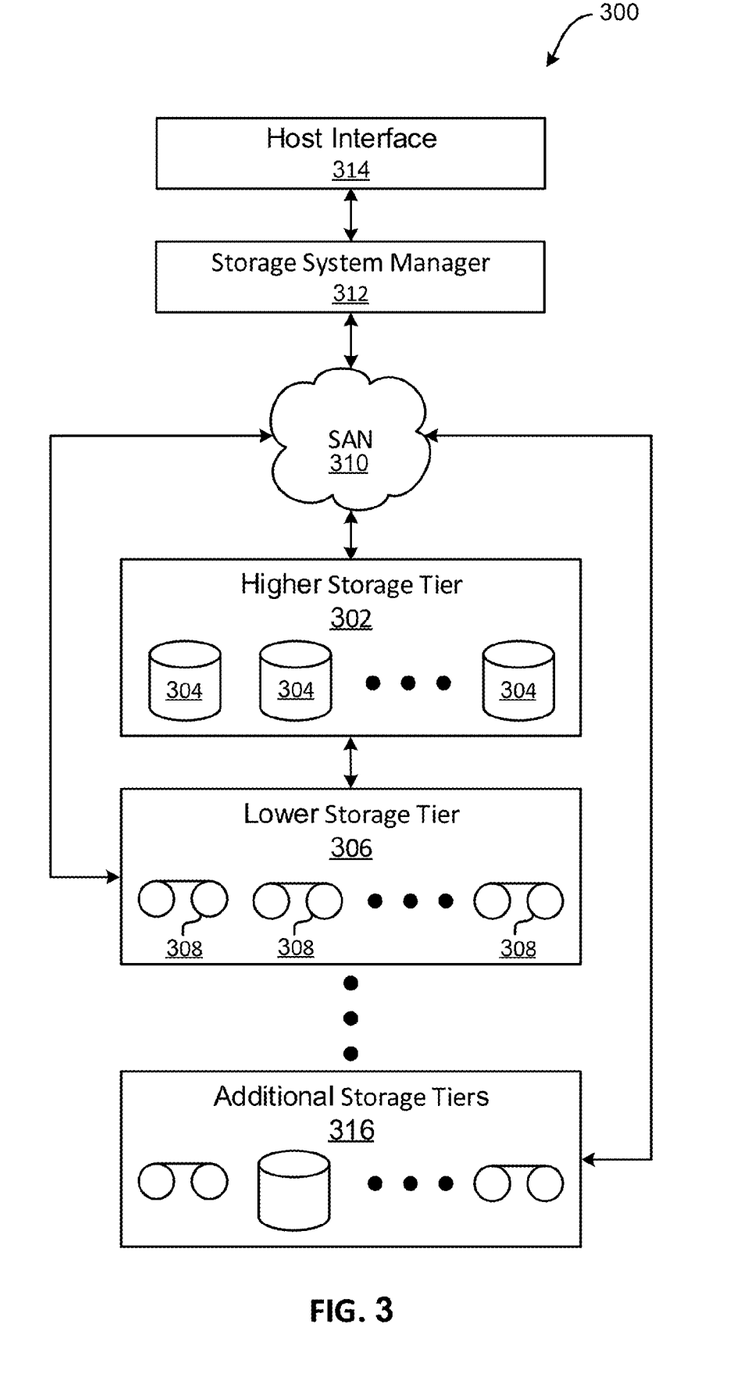
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
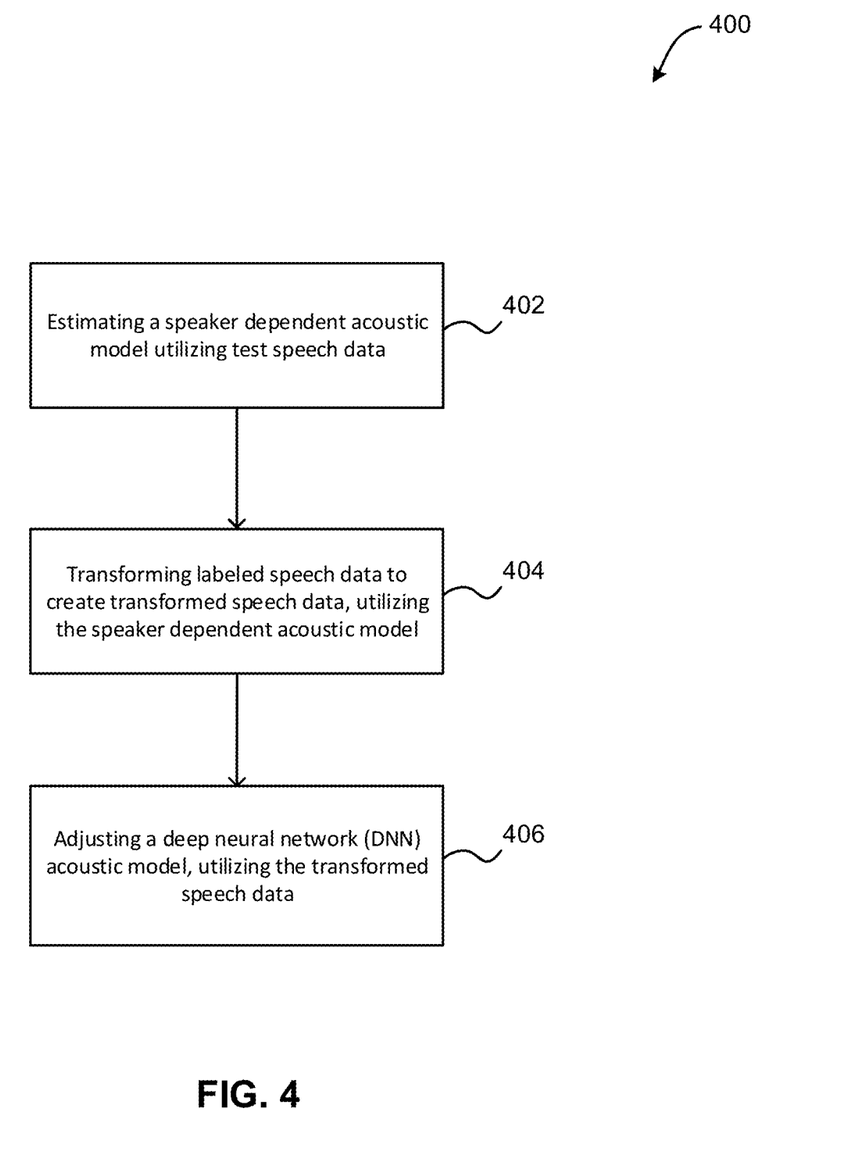
FIG. 4 illustrates a method for adjusting a deep neural network acoustic model, in accordance with one embodiment.

Now referring to FIG. 4, a flowchart of a method 400 is shown according to one embodiment. The method 400 may be performed in accordance with the present invention in any of the environments depicted in FIGS. 1-3 and 5-7, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a speaker dependent acoustic model is estimated utilizing test speech data. In one embodiment, the test speech data may include verbal data spoken by a test speaker. For example, the test speech data may include utterances such as words, sentences, etc. that are spoken by the test speaker. In another embodiment, the test speech data may include one or more acoustic characteristics of test speaker. For example, the test speech data may include one or more of environment noise, a dialect of the test speaker, an inflection of the test speaker, a pace of the test speaker, etc.

Additionally, in one embodiment, the test speaker may include a speaker whose speech is being analyzed (e.g., using automated speech recognition (ASR), etc.). In another embodiment, no transcript may be provided with the test speech data, a model may not be trained with the test speech data, etc. In yet another embodiment, estimating the speaker dependent model may include decoding the test speech data. For example, the test speech data may be decoded using a deep neural network (DNN).

Further, in one embodiment, one or more outputs of the decoding of the test speech data may be used as one or more label hypotheses for an acoustic distribution of the test speech data. In another embodiment, the one or more label hypotheses may be used to estimate the speaker dependent acoustic model. In yet another embodiment, the speaker dependent acoustic model may include a speaker dependent gaussian mixture model-hidden markov model (SD GMM-HMM) acoustic model.

Further still, in one embodiment, the speaker dependent acoustic model may be determined as part of a stochastic feature mapping (SFM) process utilizing one or more techniques. For example, the speaker dependent acoustic model may be determined utilizing maximum likelihood linear regression (MLLR). In another example, the speaker dependent acoustic model may be determined utilizing a hybrid technique that incorporates MLLR as well as a maximum a posteriori (MAP) adaptation.

Further, as shown in FIG. 4, method 400 may proceed with operation 404, where labeled speech data is transformed to create transformed speech data, utilizing the speaker dependent acoustic model. In one embodiment, the labeled speech data may include speech data that is associated with a training speaker. For example, the labeled speech data may include one or more utterances such as words, sentences, etc. that are spoken by a training speaker. In another example, the labeled speech data may include an associated transcript, where the labeled speech data and the transcript are used to train a deep neural network (DNN) model. For instance, the labeled speech data may include associated ground truth training data, labels, transcriptions, etc. In another embodiment, the labeled speech data may be received from multiple speakers that are selected randomly or based on a metric that measures a similarity or a dissimilarity between a candidate speaker and a test speaker.

In addition, in one embodiment, the transformed speech data may include the ground truth training data, labels, transcriptions, etc. that are associated with the labeled speech data. In another embodiment, transforming the labeled speech data may be performed as part of a stochastic feature mapping (SFM) process according to one or more techniques. For example, transforming the labeled speech data may be performed utilizing a linear transformation (e.g., constrained maximum likelihood linear regression (CMLLR), etc.). In another example, transforming the labeled speech data may be performed utilizing a non-linear transformation (e.g., maximum likelihood nonlinear transformation (MLNT), etc.).

Further still, as shown in FIG. 4, method 400 may proceed with operation 406, where a deep neural network (DNN) acoustic model is adjusted, utilizing the transformed speech data. In one embodiment, the DNN may include an artificial neural network that models one or more relationships.

Further still, in one embodiment, the DNN acoustic model may originally be trained using the labeled speech data. In another embodiment, the DNN acoustic model may be subsequently adjusted by re-training the model utilizing the transformed speech data. In yet another embodiment, the re-training of the DNN acoustic model may be performed over the entirety of a neural network, or a subset of layers of the neural network, with or without regularizations. The data for re-training may include the transformed speech data alone or may include a combination of the transformed speech data with ground-truth data and the original unlabeled test speech data with generated hypotheses.

In this way, the DNN acoustic model may be adapted for the test speech data, using labeled speech data transformed using the speaker dependent acoustic model. In yet another embodiment, the DNN acoustic model may be adjusted in a supervised environment (e.g., an environment including test speech data with ground truth labeling, etc.) or an unsupervised environment (e.g., an environment including test speech data without ground truth labeling, etc.) with a plurality of generated hypotheses. For example, the DNN adaptation may be supervised or unsupervised.

Also, in one embodiment, automatic speech recognition (ASR) may be performed, utilizing the adjusted DNN acoustic model. In another embodiment, the transformed speech data may have the same acoustic distribution as the test speech data. In this way, covariate shift may be avoided when performing ASR on the test speech data, utilizing the adjusted DNN acoustic model. Also, stochastic feature mapping (SFM) may be used to transform speech data and re-train a DNN acoustic model in order to improve the accuracy of the DNN acoustic model when performing ASR on the test speech data.

Figure 5:
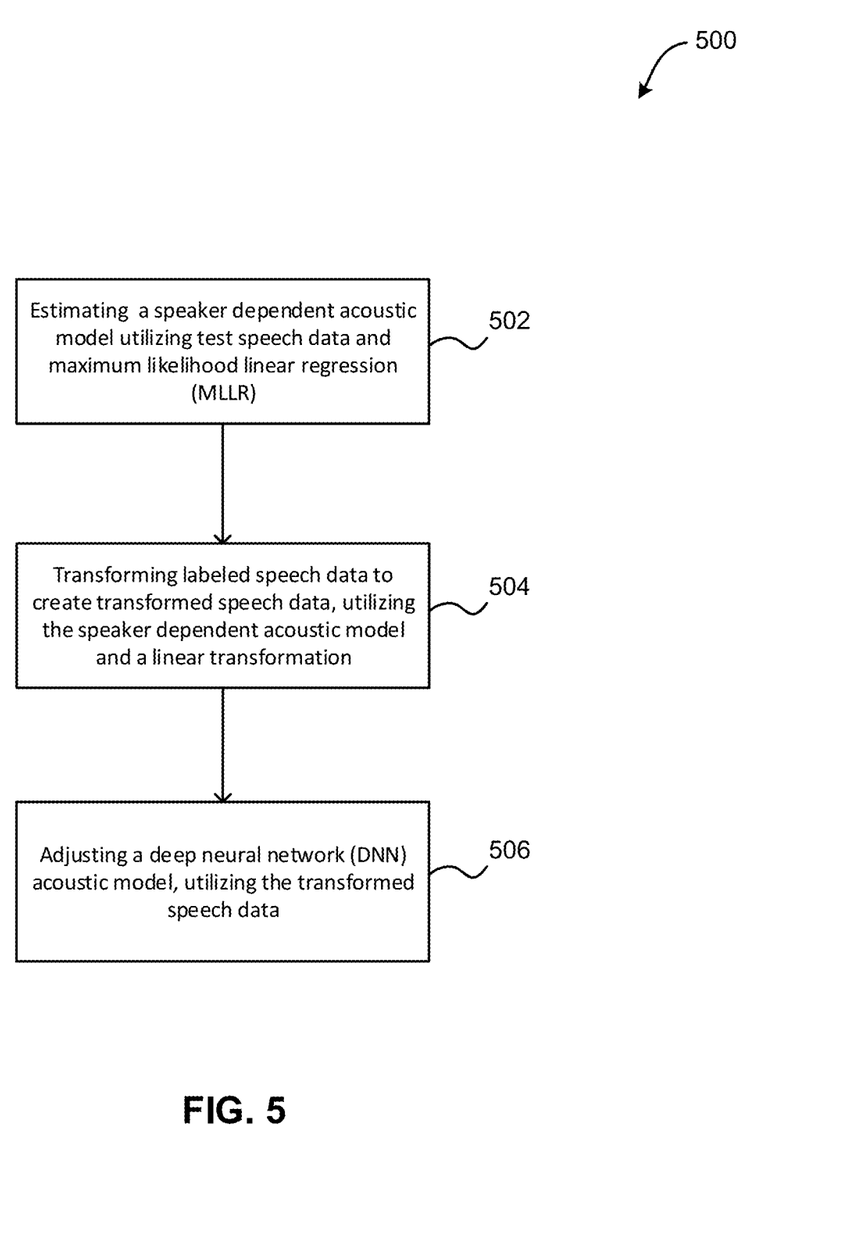
FIG. 5 illustrates another method for adjusting a deep neural network acoustic model, in accordance with one embodiment.

Now referring to FIG. 5, a flowchart of a method 500 for adjusting a deep neural network (DNN) acoustic model is shown according to one embodiment. The method 500 may be performed in accordance with the present invention in any of the environments depicted in FIGS. 1-4 and 6-7, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a speaker dependent acoustic model is estimated utilizing test speech data and maximum likelihood linear regression (MLLR).

Additionally, method 500 may proceed with operation 504, where labeled speech data is transformed to create transformed speech data, utilizing the speaker dependent acoustic model and a linear transformation. In one embodiment, the linear transformation may include constrained maximum likelihood linear regression (CMLLR).

Also, method 500 may proceed with operation 506, where a deep neural network (DNN) acoustic model is adjusted, utilizing the transformed speech data.

Figure 6:
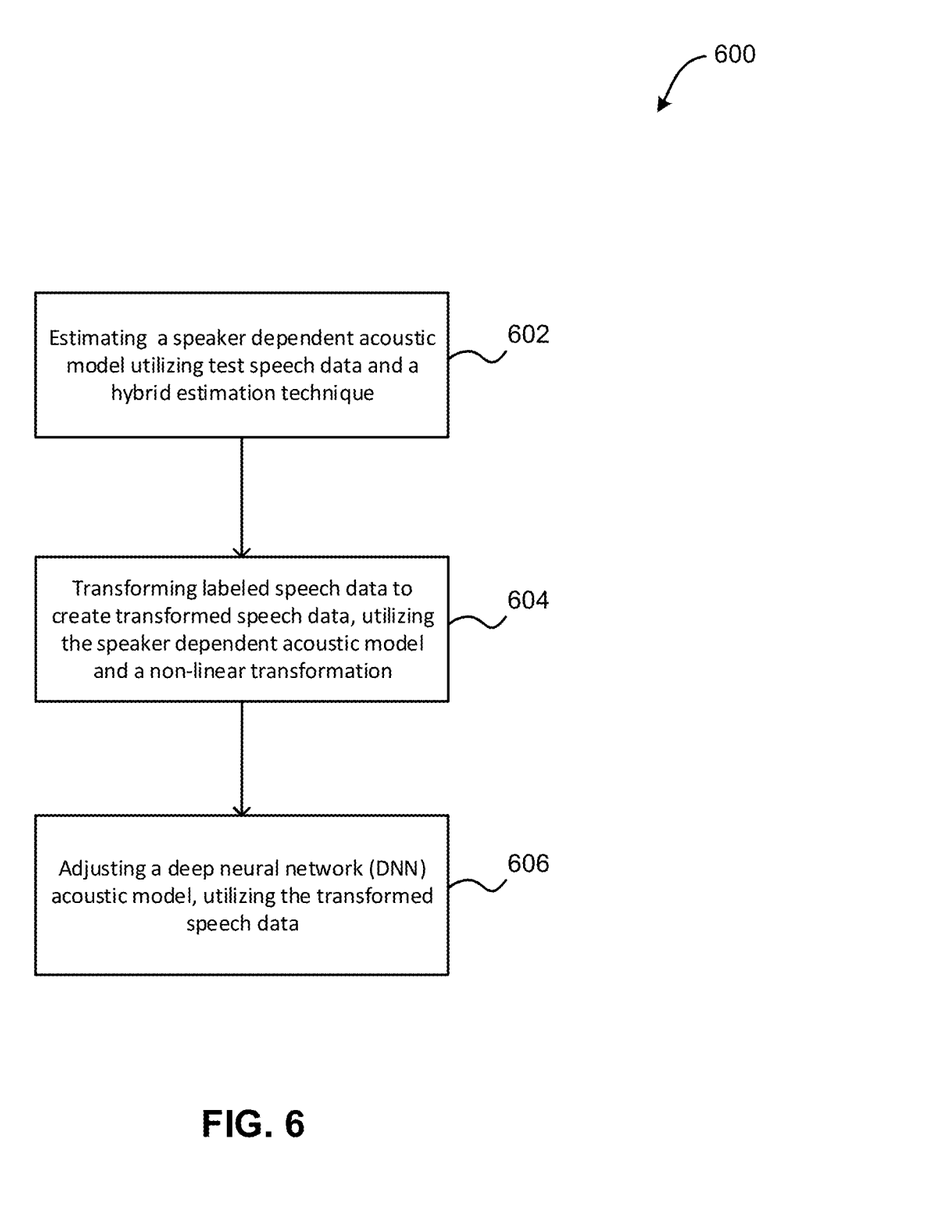
FIG. 6 illustrates another method for adjusting a deep neural network acoustic model, in accordance with one embodiment.

Now referring to FIG. 6, a flowchart of a method 600 for adjusting a deep neural network (DNN) acoustic model is shown according to one embodiment. The method 600 may be performed in accordance with the present invention in any of the environments depicted in FIGS. 1-5 and 7, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a speaker dependent acoustic model is estimated utilizing test speech data and a hybrid estimation technique. In one embodiment, the hybrid estimation technique may incorporate both maximum likelihood linear regression (MLLR) and maximum a posteriori (MAP) adaptation.

Additionally, method 600 may proceed with operation 604, where labeled speech data is transformed to create transformed speech data, utilizing the speaker dependent acoustic model and a non-linear transformation. In one embodiment, the non-linear transformation may include maximum likelihood nonlinear transformation (MLNT).

Further, method 600 may proceed with operation 606, where a deep neural network (DNN) acoustic model is adjusted, utilizing the transformed speech data.

Figure 7:
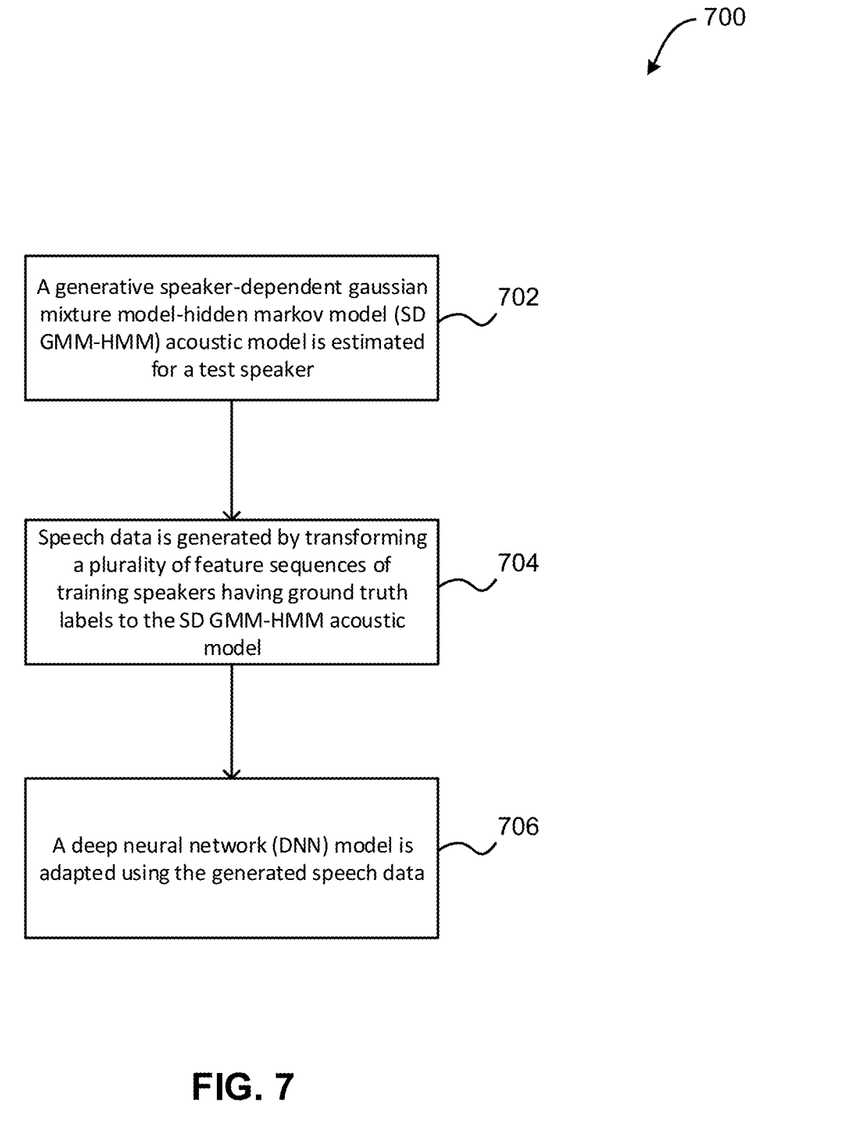
FIG. 7 illustrates a method for adapting a deep neural network model using transformed speech data, in accordance with one embodiment.

Now referring to FIG. 7, a flowchart of a method 700 for adapting a deep neural network model using transformed speech data is shown according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a generative speaker-dependent gaussian mixture model-hidden markov model (SD GMM-HMM) acoustic model is estimated for a test speaker. In one embodiment, an SFM implementation using maximum likelihood linear regression (MLLR) may be utilized for the SD GMM-HMM acoustic model estimation. In another embodiment, an SFM implementation using both a maximum likelihood linear regression (MLLR) and a maximum a posteriori (MAP) adaptation in a hybrid approach may be utilized for the SD GMM-HMM acoustic model estimation.

Additionally, method 700 may proceed with operation 704, where speech data is generated by transforming a plurality of feature sequences of training speakers having ground truth labels to the SD GMM-HMM acoustic model. In one embodiment, the transformation may be carried out as part of stochastic feature mapping (SFM) utilizing maximum likelihood criterion. In another embodiment, constrained maximum likelihood linear regression (CMLLR) may be utilized to perform the feature sequence transformation. In yet another embodiment, maximum likelihood nonlinear transformation (MLNT) may be utilized to perform the feature sequence transformation.

Further, method 700 may proceed with operation 706, where a deep neural network (DNN) model is adapted using the generated speech data. In one embodiment, the generated speech data may obey the same acoustic distribution of the test speaker and may therefore compensate for covariate shift. In this way, the adapted DNN model may include a speaker dependent DNN model.

Further still, in one embodiment, a mismatch between training and test data may give rise to covariate shift. For example, suppose one has the true acoustic distribution of a test speaker. Ideally they may sample from this distribution to generate speech data which may possess the acoustic characteristics of this speaker and use the generated speech data to adapt the original deep neural network (DNN) acoustic model. Therefore, it may be of interest to have a good estimate of acoustic distribution for a test speaker.

Also, in one embodiment, a generative SD GMM-HMM may be used to approximate the true acoustic distribution of a test speaker. In another embodiment labeled speech data may be transformed towards the SD GMM-HMM under maximum likelihood (ML) criterion. This may include stochastic feature mapping (SFM).

Table 1 illustrates an exemplary algorithm for implementing SFM-based unsupervised DNN adaptation, in accordance with one embodiment. Of course, it should be noted that the algorithm shown in Table 1 is set forth for illustrative purposes only, and thus should not be construed as limiting in any manner.

TABLE 1

$\mathcal{H}$ ← a designated feature space;
M ← number of test speakers;
K ← number of speakers with labeled speech data;
for m ← 1,..., M do TABLE 1-continued Decode speech of test speaker m using original DNN and use the decoding outputs as label hypotheses;
Estimate a speaker dependent model $\lambda \mathcal{H}^{(m)}$ in feature space $\mathcal{H}$ for speaker m;
end for
for m ← 1,..., M do
   for k ← 1,..., K do
      Estimate a transformation $\mathcal{F}$ based on the speaker dependent model $\lambda \mathcal{H}^{(m)}$ and all utterances from speaker k in feature space $\mathcal{H}$, maximizing the likelihood function $\mathcal{L}(\mathcal{F}(\mathcal{O}\mathcal{H}^{(k)})|\lambda \mathcal{H}^{(m)})$;
      Map utterances from speaker k to test speaker m using $\mathcal{F}$ in feature space $\mathcal{H}$;
   end for
   Adapt original DNN for test, speaker m using all $\mathcal{F}$-transformed utterances from K speakers;
end for In this way, an SFM-based data approach may be used to perform unsupervised DNN adaptation.

Additionally, in one embodiment, the SD GMM-HMM acoustic model $\lambda_{\mathcal{H}}^{(m)}$ shown in Table 1 may be estimated by model space maximum likelihood linear regression (MLLR) from a speaker independent (SI) GMM-HMM. Table 2 illustrates an exemplary estimation methodology, in accordance with one embodiment. Of course, it should be noted that the estimation methodology shown in Table 2 is set forth for illustrative purposes only, and thus should not be construed as limiting in any manner.

TABLE 2

$\hat{\mu} = A\mu + b$
$\hat{\Sigma} = B^T H B$
where $\mu$ and $\Sigma$ are means and covariances of the SI GMM-HMM; B is the inverse of the Cholesky factor C of the inverse of the original covariance matrix
$\Sigma^{-1} = CC^T$ Further, in one embodiment, the granularity of the transformation may be dynamically controlled by a regression tree depending on the amount of data available. In another embodiment, the transformation $\mathcal{F}$ in Table 1 may have a linear form. Table 3 illustrates an exemplary linear transformation, in accordance with one embodiment. Of course, it should be noted that the linear transformation shown in Table 3 is set forth for illustrative purposes only, and thus should not be construed as limiting in any manner.

TABLE 3

$\mathcal{F}(\mathcal{O}_{\mathcal{H}}^{(k)}) = A\mathcal{O}_{\mathcal{H}}^{(k)} + b$
where $\mathcal{O}_{\mathcal{H}}^{(k)}$ is the feature sequence in feature space $\mathcal{H}$. The transformation is estimated by CMLLR:

$\{\tilde{A}, \tilde{b}\} = \underset{\{A,b\}}{\operatorname{argmax}} \log P(A\mathcal{O}_{\mathcal{H}}^{(k)} + b | \lambda_{\mathcal{H}}^{(m)})$ Further still, in one embodiment, speakers with labeled speech shown in Table 1 may include any speakers with labeled speech available. For example, speakers may be used from the training set from which the original DNN is trained. This may be equivalent to compensating for covariate shift by transforming the distribution of training data to make it approximately obey the distribution of the test data.

In this way, maximum likelihood linear regression (MLLR) may be used for SD model estimation and constrained maximum likelihood linear regression (CMLLR) may be used for feature sequence transformation.

Also, in one embodiment, maximum a posteriori (MAP) adaptation may converge to the SD estimate when sufficient training data is available. In another embodiment, the MAP adaptation may be local, such that only Gaussians with training samples may be adapted. The merits of an MLLR estimate and the MAP estimate may be combined into a hybrid estimate so that the resulting SD model may be closer to the true speaker manifold.

Table 4 illustrates an exemplary hybrid estimate, in accordance with one embodiment. Of course, it should be noted that the hybrid estimate shown in Table 4 is set forth for illustrative purposes only, and thus should not be construed as limiting in any manner.

TABLE 4

$$\hat{\mu}_{MAP} = \frac{\tau \mu_{MLLR} + \sum_t \gamma_t o_t}{\tau + \sum_t \gamma_t}$$

where $\mu_{MLLR}$ is the mean prior from the MLLR-adapted model; $\tau$ is a hyperparameter that balances the new estimate and the prior; $\gamma_t$ are the posteriors of $o_t$ at a particular Gaussian.

In addition, in one embodiment, only the means may be adapted in the MAP step. In another embodiment, the linear mapping function of $\mathcal{F}$ using CMLLR may be replaced by a nonlinear mapping function. For example, a maximum likelihood nonlinear transformation (MLNT) may be used, where a DNN may be used for the nonlinear mapping. MLNT may enable a powerful mapping function for feature sequence mapping.

Table 5 illustrates an exemplary MLNT formulation, in accordance with one embodiment. Of course, it should be noted that the MLNT formulation shown in Table 5 is set forth for illustrative purposes only, and thus should not be construed as limiting in any manner.

TABLE 5

MLNT is mathematically formulated as estimating a mappping function f that maximizes the following log-likelihood $$f^* = \max_f \log P(f(O_{\mathcal{H}}^{(m)}) | \lambda_{\mathcal{H}}^{(m)}).$$

In one embodiment, the mapping function $f$ may take a form of a DNN as shown in Table 1. The parameters of $f$ may include the weights of the network whose input and output have the same dimensionality. In another embodiment, MLNT may be viewed as a nonlinear extension of CMLLR. In yet another embodiment, the MLNT implementation may be learned in a block-wise manner with CMLLR pre-training.

Furthermore, in one embodiment, a full language pack (FLP) may include 40 hours of training data with 421 speakers from the conversational speech only. WERs may be measured on the development set which has 20 hours of speech from 142 speakers.

Also, in one embodiment, the baseline DNN model may have 5 hidden layers. Each hidden layer may have 1,024 hidden units. The bottom three hidden layers may use ReLU activation functions while the top two hidden layers may use sigmoid activation functions. The softmax output layer may have 3,000 units. After a layer-wise discriminative pre-training, cross-entropy (CE) training may be performed at the frame level for 15 iterations. The CE training may use a mini-batch based stochastic gradient descent (SGD) algorithm with frame randomization. After the CE training, the DNNs may be further optimized using the Hessian-free (HF) sequence training under state-level minimum Bayes risk (sMBR) criterion.

Additionally, in one embodiment, the input to the DNN may consist of 9 frames of 40-dimensional speaker-adapted LDA features after CMLLR. The LDA features may be computed from 13-dimensional mean-normalized perceptual linear prediction (PLP) features with vocal tract length normalization (VTLN). After taking into the context information by splicing the adjacent 9 frames, the LDA may project the feature dimensionality down to 40 and it may be further decorrelated by a global semi-tied covariance (STC) matrix.

Further, in one embodiment, given the speaker-adapted LDA input features, an SI ML GMM-HMM acoustic model may be estimated in the LDA feature space right before CMLLR. The SI GMM-HMM acoustic model may have 3,000 quinphone states and 30,000 Gaussians. For each test speaker, this SI GMM-HMM may be adapted to an SD GMM-MM using the speech from the test speaker and label hypotheses. In another embodiment, the mapping from a training speaker to a test speaker may be carried out in the LDA space.

Table 6 illustrates the transformed features from the training speaker k to a test speaker m, in accordance with one embodiment. Of course, it should be noted that the transformed features shown in Table 6 are set forth for illustrative purposes only, and thus should not be construed as limiting in any manner.

TABLE 6

$$O_{CMLLR}^{(m)} = \mathcal{T}_m \circ \mathcal{F}(O_{LDA}^{(k)})$$

where $\mathcal{T}_m$ is the CMLLR transformation for the test speaker m

Further still, in one embodiment, the MLLR+MAP hybrid estimation for SD GMM-HMM may be iterated twice. The hyperparameter $\tau$ in the MAP step may be set to 10. The network for MLNT may have 2 blocks where each block has one hidden layer of 100 hidden units with hyperbolic tangent activation functions and one linear output layer.

Also, in one embodiment, under the SFM-based unsupervised adaptation, the baseline DNN may be retrained with SFM-transformed speech for each test speaker and such adapted DNNs may yield significant gains over the baseline DNN, especially at the CE stage. For example, when using MLLR for SD acoustic model estimation and CMLLR for feature mapping in SFM, the adapted DNN may obtain improvement after CE training and improvement after HF sMBR sequence training over the baseline. In another example, when using MLLR+MAP for SD acoustic model estimation and MLNT for feature mapping in SFM, the adapted DNN may obtain improvement after CE training and improvement after HF sMBR sequence training. In another embodiment, improved SFM implementation with hybrid MLLR and MAP estimate and nonlinear mapping may yield improvement after CE training and improvement after HF sMBR sequence training.

Additionally, in one embodiment, an SFM-based adaptation approach may deal with labels with errors and data sparsity, two major obstacles for unsupervised DNN speaker adaptation.

In another embodiment, label hypotheses may be used for the estimation of SD GMM-HMM acoustic models of test speakers. The GMM-HMMs may have a generative structure which may allow flexible tying of parameters, which may make them less sensitive to errors in the labels compared to discriminative models such as DNNs. In yet another embodiment, given the estimated SD acoustic models, all the generated speech feature sequences transformed from training speakers may have ground-truth labels, which may benefit the adaptation of DNNs.

Further, in one embodiment, speakers with labeled speech may be used for the mapping. As a result, there may be an unlimited amount of speech data that may be transformed, which may mitigate any data sparsity issue. In another embodiment, in the experiments all speakers in the training set may be transformed towards the SD acoustic model of each test speaker. This may amount to mapping all training speakers' "voices" to each of the test speakers. This may compensate for the covariate shift. As a result, each test speaker may have about 40 hours of speech and the adapted DNN may be viewed as an SD DNN. Depending on the amount of transformed data, the original DNN may also be partially adapted.

Further still, in one embodiment, the adaptation may be parallelized by speakers and for each speaker it may be parallelized both at CE and HF sMBR sequence training stages. The total workload of this approach may be linearly proportional to the number of speakers in the test set.

In this way, an unsupervised DNN speaker adaptation approach may be implemented that may be based on stochastic feature mapping. To deal with covariate shift, a generative speaker dependent GMM-HMM acoustic model may first be estimated for each test speaker, and speakers in the training set with labeled speech data may be mapped to the test speaker. The original DNN acoustic model may be retrained using the transformed speech with ground-truth labels. One implementation may use MLLR for estimating SD GMM-HMM and CMLLR for feature mapping, and another implementation may use a hybrid MLLR/MAP estimate for SD GMM-HMM and a DNN-based nonlinear transformation for feature mapping. This SFM-based unsupervised DNN adaption may obtain significant improvements over a DNN baseline using speaker-adapted LDA input features.

More specifically, a data approach to unsupervised speaker adaptation of DNNs may be enabled. For example, a generative speaker-dependent (SD) GMM-HMM model may first be estimated based on label hypotheses for the acoustic distribution of each test speaker. Given this target distribution, speech data may be generated by transforming feature sequences of the training speakers with ground-truth labels to the SD acoustic model, which may be carried out by stochastic feature mapping (SFM) under the maximum likelihood (ML) criterion. The original DNN may then be adapted using the generated speech data which may approximately obey the same acoustic distribution of the test speaker and may therefore compensate for covariate shift. This approach may generate an unlimited amount of adaptation data with ground-truth labels. As a result, the adapted DNN may be viewed as an SD DNN.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   estimating a speaker dependent acoustic model utilizing test speech data and a hybrid estimation technique, including:
      decoding the test speech data,
      identifying one or more outputs of the decoding as one or more label hypotheses for an acoustic distribution of the test speech data, and
      estimating the speaker dependent acoustic model, utilizing the one or more label hypotheses;
   transforming labeled speech data by applying a nonlinear transformation to the labeled speech data utilizing the speaker dependent acoustic model to create transformed speech data having the acoustic distribution of the test speech data;
   adjusting a deep neural network (DNN) acoustic model to compensate for a covariate shift, utilizing the transformed speech data, where:
      the DNN acoustic model is originally trained using the labeled speech data, and
      adjusting the DNN acoustic model includes re-training the DNN acoustic model,
   utilizing the transformed speech data; and
   performing automatic speech recognition (ASR), utilizing the adjusted DNN acoustic model.

2. The computer-implemented method of claim 1, wherein the hybrid estimation technique incorporates both maximum likelihood linear regression (MLLR) and maximum a posteriori (MAP) adaptation.

3. The computer-implemented method of claim 1, wherein:
   the labeled speech data includes speech data associated with a training speaker;
   the labeled speech data includes ground truth training data, labels and transcriptions;
   the labeled speech data is received from multiple speakers;
   the nonlinear transformation includes a maximum likelihood nonlinear transformation (MLNT); and
   the transformed speech data includes the ground truth training data, labels and transcriptions of the labeled speech data.

4. The computer-implemented method of claim 1, wherein
   the test speech data includes verbal data spoken by a test speaker, the labeled speech data includes verbal data spoken by a plurality of randomly selected speakers, the speaker dependent acoustic model is estimated for the test speaker, and speech of the test speaker is analyzed during the performing of the ASR.

5. The computer-implemented method of claim 1, wherein estimating the speaker dependent acoustic model and transforming the labeled speech data are performed as part of a stochastic feature mapping (SFM) process, utilizing a maximum likelihood non-linear transformation (MLNT).

6. The computer-implemented method of claim 1, wherein the labeled speech data is received from multiple speakers that are selected randomly.

7. The computer-implemented method of claim 1, wherein the labeled speech data is received from multiple speakers that are selected based on a metric that measures a similarity or a dissimilarity between a candidate speaker and a test speaker.

8. The computer-implemented method of claim 1, wherein the DNN acoustic model is adjusted in a supervised environment, the supervised environment including the test speech data with ground truth labeling.

9. The computer-implemented method of claim 1, wherein the DNN acoustic model is adjusted in an unsupervised environment with a plurality of generated hypotheses, the unsupervised environment including the test speech data without ground truth labeling.

10. The computer-implemented method of claim 1, wherein:

the transformed speech data includes the ground truth training data, labels and transcriptions of the labeled speech data, the labeled speech data includes verbal data spoken by a plurality of randomly selected speakers, estimating the speaker dependent acoustic model and transforming the labeled speech data are performed as part of a stochastic feature mapping (SFM) process, utilizing a maximum likelihood non-linear transformation (MLNT), and the test speech data includes acoustic characteristics of a test speaker, the acoustic characteristics including an environment noise, a dialect of the test speaker, an inflection of the test speaker, and a pace of the test speaker.

11. The computer-implemented method of claim 1, wherein:

the test speech data includes verbal data spoken by a test speaker, has no ground truth labeling, and includes one or more acoustic characteristics of the test speaker, the labeled speech data is received from multiple speakers, and includes ground truth labeling, the DNN acoustic model is re-trained utilizing a combination of the transformed speech data, the ground truth labeling, the test speech data, and the one or more label hypotheses, and the DNN acoustic model is adjusted in an unsupervised environment.

12. The computer-implemented method of claim 1, wherein:

the test speech data includes verbal data spoken by a test speaker, has no ground truth labeling, and includes acoustic characteristics of the test speaker, the acoustic characteristics including an environment noise, a dialect of the test speaker, an inflection of the test speaker, and a pace of the test speaker, the labeled speech data is received from a plurality of randomly selected speakers, and includes ground truth labeling and an associated transcript, the transformed speech data includes the ground truth labeling and the associated transcript of the labeled speech data, estimating the speaker dependent acoustic model and transforming the labeled speech data are performed as part of a stochastic feature mapping (SFM) process, utilizing a maximum likelihood non-linear transformation (MLNT), the DNN acoustic model is re-trained utilizing a combination of the transformed speech data, the ground truth labeling, the test speech data, and the one or more label hypotheses, and the DNN acoustic model is adjusted in an unsupervised environment.

13. A computer program product for adjusting a deep neural network (DNN) acoustic model, the computer program product comprising a computer readable storage medium having program instructions embodied therewith, wherein the computer readable storage medium is not a transitory signal per se, the program instructions executable by a processor to cause the processor to perform a method comprising:

estimating, utilizing the processor, a speaker dependent acoustic model utilizing test speech data and a hybrid estimation technique, including:

decoding the test speech data, identifying one or more outputs of the decoding as one or more label hypotheses for an acoustic distribution of the test speech data, and estimating the speaker dependent acoustic model, utilizing the one or more label hypotheses;

transforming, utilizing the processor, labeled speech data by applying a nonlinear transformation to the labeled speech data utilizing the speaker dependent acoustic model to create transformed speech data having the acoustic distribution of the test speech data;

adjusting, utilizing the processor, the DNN acoustic model to compensate for a covariate shift, utilizing the transformed speech data, where:

the DNN acoustic model is originally trained using the labeled speech data, and adjusting the DNN acoustic model includes re-training the DNN acoustic model, utilizing the processor and the transformed speech data; and performing, utilizing the processor, automatic speech recognition (ASR), utilizing the adjusted DNN acoustic model.

14. The computer program product of claim 13, wherein the hybrid estimation technique incorporates both maximum likelihood linear regression (MLLR) and maximum a posteriori (MAP) adaptation.

15. The computer program product of claim 13, wherein:

the labeled speech data includes speech data associated with a training speaker;

the labeled speech data includes ground truth training data, labels and transcriptions;

the labeled speech data is received from multiple speakers;

the nonlinear transformation includes a maximum likelihood nonlinear transformation (MLNT); and the transformed speech data includes the ground truth training data, labels and transcriptions of the labeled speech data.

16. The computer program product of claim 13, wherein:

the test speech data includes verbal data spoken by a test speaker, the labeled speech data includes verbal data spoken by a plurality of randomly selected speakers, the speaker dependent acoustic model is estimated for the test speaker, and speech of the test speaker is analyzed during the performing of the ASR.

17. The computer program product of claim 13, wherein estimating the speaker dependent acoustic model and transforming the labeled speech data are performed as part of a stochastic feature mapping (SFM) process, utilizing a maximum likelihood non-linear transformation (MLNT).

18. The computer program product of claim 13, wherein the labeled speech data is received from multiple speakers that are selected randomly.

19. The computer program product of claim 13, wherein the labeled speech data is received from multiple speakers that are selected based on a metric that measures a similarity or a dissimilarity between a candidate speaker and a test speaker.

20. A system, comprising:

a processor; and logic integrated with the processor, executable by the processor, or integrated with and executable by the processor, the logic being configured to:

estimate a speaker dependent acoustic model utilizing test speech data and a hybrid estimation technique, including:

decoding the test speech data, identifying one or more outputs of the decoding as one or more label hypotheses for an acoustic distribution of the test speech data, and estimating the speaker dependent acoustic model, utilizing the one or more label hypotheses;

transform labeled speech data by applying a nonlinear transformation to the labeled speech data utilizing the speaker dependent acoustic model to create transformed speech data having the acoustic distribution of the test speech data;

adjust a deep neural network (DNN) acoustic model to compensate for a covariate shift, utilizing the transformed speech data, where:

the DNN acoustic model is originally trained using the labeled speech data, and adjusting the DNN acoustic model includes re-training the DNN acoustic model, utilizing the transformed speech data; and perform automatic speech recognition (ASR), utilizing the adjusted DNN acoustic model.

\* \* \* \* \*